(12) United States Patent
Ng et al.

(10) Patent No.: US 10,369,903 B2
(45) Date of Patent: Aug. 6, 2019

(54) SEAT HEIGHT ADJUSTMENT ACTUATOR

(71) Applicant: EUROSPEC MANUFACTURING INC., Newmarket (CA)

(72) Inventors: Pius Koon-Pun Ng, Markham (CA); Parth Jitendra Shahiwala, Whitby (CA); Russel Vincent Gillis, Schomberg (CA)

(73) Assignee: SLIFE HOLDINGS INC., Midhurst (CA)

( * ) Notice: Subject to any disclaimer, the term of this patent is extended or adjusted under 35 U.S.C. 154(b) by 276 days.

(21) Appl. No.: 15/283,902

(22) Filed: Oct. 3, 2016

(65) Prior Publication Data

US 2017/0120777 A1    May 4, 2017

Related U.S. Application Data

(60) Provisional application No. 62/248,439, filed on Oct. 30, 2015.

(51) Int. Cl.
  *F16D 41/066* (2006.01)
  *B60N 2/16* (2006.01)
  (Continued)

(52) U.S. Cl.
  CPC .............. *B60N 2/168* (2013.01); *B60N 2/167* (2013.01); *B60N 2/1635* (2013.01);
  (Continued)

(58) Field of Classification Search
  CPC ........ B60N 2/165; B60N 2/16; B60N 2/1635; F16D 15/00; F16D 41/066; F16D 41/088
  See application file for complete search history.

(56) References Cited

U.S. PATENT DOCUMENTS 5,896,973 A * 4/1999 Hochmuth ............... B60N 2/02
                                                        192/223.2
6,032,777 A * 3/2000 Denis ................... B60N 2/2227
                                                        192/223.2
(Continued)

FOREIGN PATENT DOCUMENTS

EP           1867518 A1   12/2007
KR      1020150114054 A   10/2015
(Continued)

OTHER PUBLICATIONS

Extended European Search Report dated Mar. 24, 2017 for European Patent Application No. 16196349.1.

*Primary Examiner* — Stacey A Fluhart
(74) *Attorney, Agent, or Firm* — Perry + Currier Inc.

(57) ABSTRACT

An actuator includes a pinion engaging a seat height adjustment mechanism. A brake drum fixed to the seat defines an outer brake race. A brake hub integrated with the pinion, rotatable in the brake drum, defines an inner brake race. Rolling brake elements between the brake races lock the brake hub to the brake drum in the absence of actuator input. A clutch drum covers the brake races, defines an outer clutch race, and includes clutch tabs to displace the rolling brake elements, unlocking the brake hub, responsive to actuator input. A driver cam rotatable within the clutch drum defines an inner clutch race. Rolling clutch elements in the clutch races transmit actuator input to the clutch drum and permit rotation of the driver cam relative to the clutch drum in the absence of actuator input. An exterior cup fixed to the brake drum defines a housing for the actuator.

16 Claims, 14 Drawing Sheets

(51) Int. Cl.
*F16D 41/08* (2006.01)
*F16D 15/00* (2006.01)
(52) U.S. Cl.
CPC ......... *F16D 41/066* (2013.01); *F16D 41/088* (2013.01); *F16D 15/00* (2013.01)

(56) References Cited

U.S. PATENT DOCUMENTS

| | | | | |
|---|---|---|---|---|
| 6,273,233 | B1* | 8/2001 | Denis | B60N 2/2257 |
| | | | | 192/223.2 |
| 6,508,347 | B1* | 1/2003 | Hochmuth | B60N 2/2227 |
| | | | | 192/44 |
| 7,048,107 | B1* | 5/2006 | Geis | B25F 5/001 |
| | | | | 192/223.2 |
| 7,651,164 | B2* | 1/2010 | Garnier | B60N 2/2257 |
| | | | | 297/344.12 |
| 8,348,344 | B2* | 1/2013 | Richard | B60N 2/167 |
| | | | | 297/344.12 |
| 9,994,132 | B2* | 6/2018 | Stemmer | B60N 2/933 |

FOREIGN PATENT DOCUMENTS

| | | |
|---|---|---|
| WO | WO-2008038943 A1 | 4/2008 |
| WO | WO-2014020284 A1 | 2/2014 |
| WO | WO-2014021582 A1 | 2/2014 |

* cited by examiner

SEAT HEIGHT ADJUSTMENT ACTUATOR

CROSS-REFERENCE TO RELATED APPLICATION

This application claims priority from U.S. Provisional Patent Application No. 62/248,439, filed Oct. 30, 2015, the content of which is incorporated herein by reference.

FIELD

The specification relates generally to seat adjustment mechanisms, and specifically to an actuator for a seat height adjustment mechanism.

BACKGROUND

Seats, such as those in motor vehicles, may be provided with mechanisms for adjusting the position thereof. Such mechanisms may permit, for example, the adjustment of the height of the seat. Adjustment mechanisms may be driven by manual or motorized actuators. A variety of manual actuators for adjustment mechanisms are known in the art; however, such actuators may be complex arrangements of parts that are costly to produce, prone to failure, heavy or large, or any combination of the above.

SUMMARY

According to an aspect of the specification, a seat height adjustment actuator is provided, comprising: (a) a brake drum for fixing to the seat, and defining an outer brake race around an opening through the brake drum; an output component including: (i) a brake hub rotatably receivable in the outer brake race, and defining an inner brake race complementary to the outer brake race; and (ii) a pinion integrated with the brake hub, and configured to extend through the brake drum opening to engage a seat adjustment mechanism; (b) a plurality of rolling brake elements between the inner and outer brake races, for locking the brake hub relative to the brake drum in the absence of an actuator input; (c) a clutch assembly including: (i) a clutch drum configured to rotatably cover the inner and outer brake races, defining an outer clutch race, and having a plurality of clutch tabs configured to extend between the inner and outer brake races for displacing the rolling brake elements to unlock the brake hub in response to an actuator input; (ii) a driver cam rotatably receivable within the outer clutch race; the driver cam defining an inner clutch race complementary to the outer clutch race; the driver cam configured for coupling to a handle to receiving an actuator input; and (iii) a plurality of rolling clutch elements between the inner and outer clutch races, for transmitting an actuator input to the clutch drum and permitting rotation of the driver cam relative to the clutch drum in the absence of an actuator input; and (d) an exterior cup fixed to the brake drum to define a housing enclosing the output component and the clutch assembly; the exterior cup having an opening therethrough.

BRIEF DESCRIPTIONS OF THE DRAWINGS

Embodiments are described with reference to the following figures, in which.

DETAILED DESCRIPTION OF THE EMBODIMENTS

Figure 1:
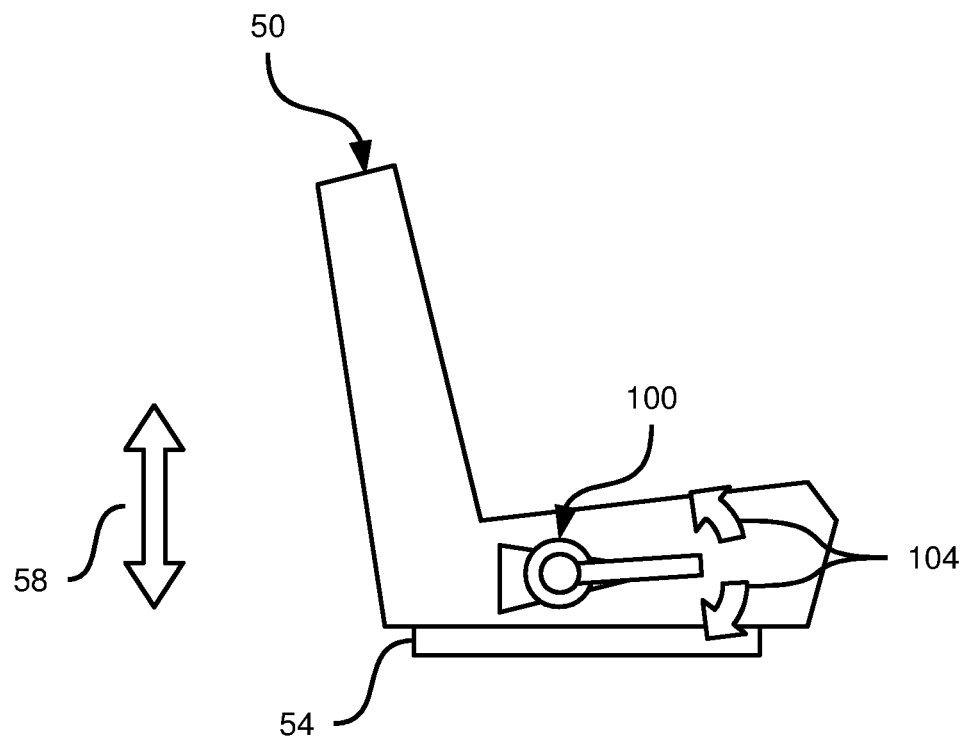
FIG. 1 depicts a seat with an actuator for a height adjustment mechanism, according to a non-limiting embodiment.

FIG. 1 depicts a seat 50, such as a vehicle seat. The position of seat 50 relative to a base 54 on which seat 50 is supported may be adjustable in a variety of ways. In the present embodiment, at least the height of seat 50 is adjustable. In other words, the position of seat 50 can be adjusted in the directions indicated by an arrow 58 in FIG. 1. Such adjustments are performed by actuating a height adjustment mechanism disposed within one or both of seat 50 and base 54. A variety of such height adjustment mechanisms will now occur to those skilled in the art, and no further discussion on such mechanisms is provided herein.

Also shown in FIG. 1 is a seat height adjustment actuator 100, also referred to herein simply as actuator 100. Actuator 100 is fixed to seat 50 (although actuator 100 may alternatively be fixed to base 54 in some embodiments). As will be discussed in greater detail below, rotating a handle of actuator 100 in the directions indicated by arrows 104 raises or lowers the position of seat 50.

Figure 2A:
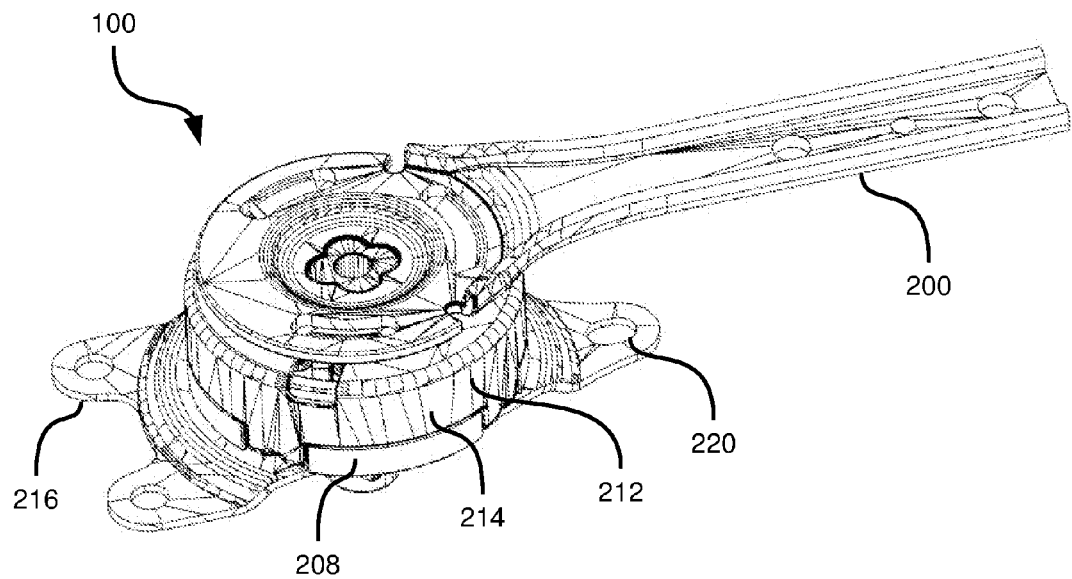
FIGS. 2A and 2B depict the assembled actuator of FIG. 1, according to a non-limiting embodiment.
Figure 2B:
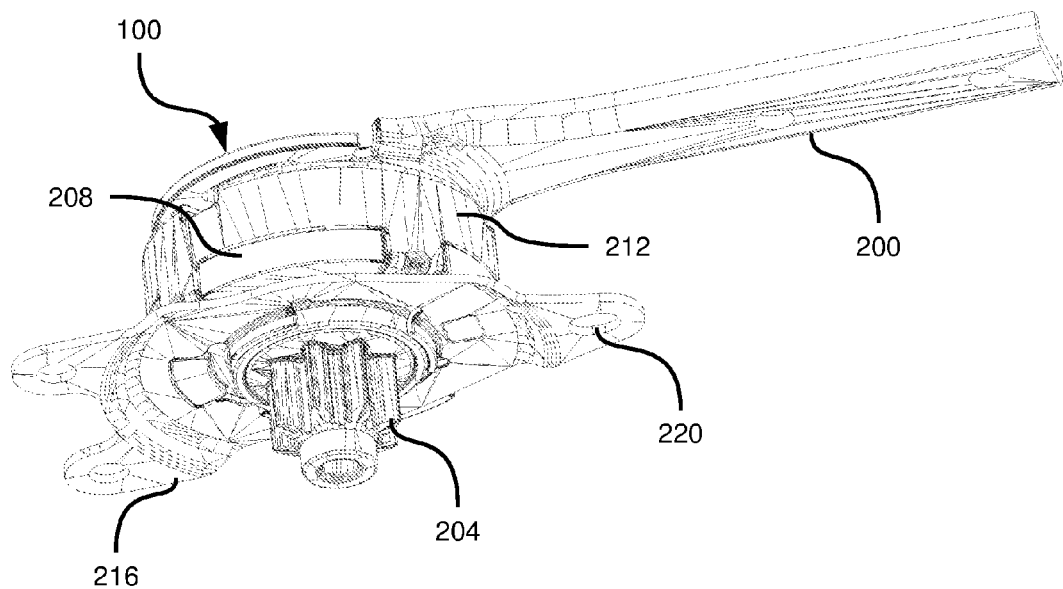

Referring now to FIGS. 2A and 2B, actuator 100 is shown in isolation, with the upper or distal (i.e. further from seat 50 when actuator 100 is installed) and lower or proximal (i.e.

closer to seat 50 when actuator 100 is installed) ends of actuator 100 visible, respectively.

In general, to operate actuator 100, an actuator input is received in the form of force exerted on a handle 200. The actuator input is transmitted to a pinion 204, via various components (to be discussed below) enclosed by a housing defined by a brake drum 208 for fixing (e.g. substantially immovably attaching) to seat 50 and an exterior cup 212 fixed to brake drum 208. Exterior cup 212 can be fixed to brake drum 208 in a variety of ways (e.g. welding, fasteners such as bolts or rivets). In the present embodiment, exterior cup 212 is fixed to brake drum 208 by way of a plurality of crimp-on elements 214 that can be press-fitted around an outer wall of brake hub 208. Brake hub 208 can also include indentations in the outer wall for receiving crimp-on elements 214. Pinion 204 rotates in response to the actuator input, and thus actuates the seat height adjustment mechanism (not shown).

Brake drum 208 can be fixed to seat 50 directly in some embodiments. In other embodiments, including the embodiment illustrated in FIGS. 2A and 2B, brake drum 208 can be fixed to seat 50 via a base plate 216. Brake drum 208 can be fixed to base plate 216 in any suitable manner, including any one of or any suitable combination of mechanical interlocking (e.g. tabs on brake drum 208 can fit into corresponding slots on base plate 216), fasteners (e.g. bolts, adhesives and the like), welding and the like. Base plate 216, in turn, can be fixed to seat 50 via a set of fastener holes 220 (in the present example, base plate 216 includes three fastener holes 220) for receiving fasteners (e.g. bolts, not shown) extending into receiving holes in seat 50.

Figure 3:
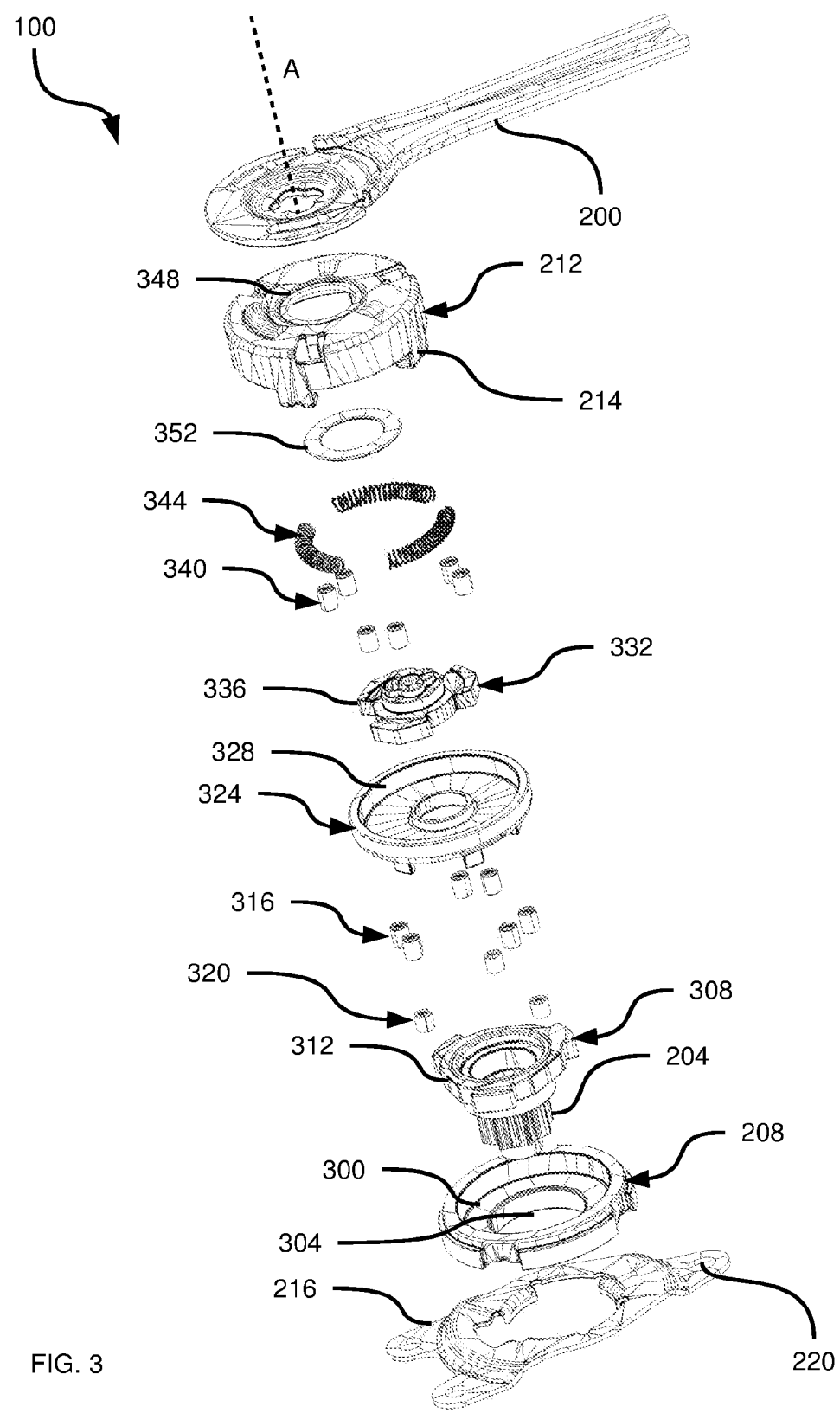
FIG. 3 depicts an exploded view of the actuator of FIG. 1, according to a non-limiting embodiment.
Figure 4A:
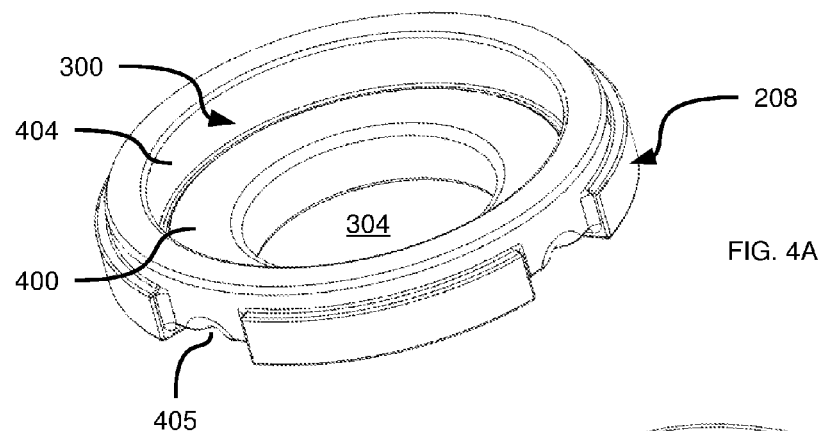
FIGS. 4A and 4B depict a brake drum of the actuator of FIG. 1, according to a non-limiting embodiment.

Turning now to FIG. 3, an exploded view of actuator 100 is shown. As seen in FIG. 3, actuator 100 includes the above-mentioned brake drum 208 for fixing to seat 50 (in the present example, via base plate 216 as mentioned earlier). Brake drum 208 defines an outer (i.e. further from axis A) brake race 300 around an opening 304 through brake drum 208. As seen in FIG. 4A, outer brake race 300 includes a support surface 400 that is substantially perpendicular to an axis of rotation A (shown in FIG. 3) about which the rotatable components of actuator 100 rotate. Outer brake race 300 also includes a wall 404 surrounding the support surface, and substantially parallel to axis A. Brake drum 208 can also include channels for receiving crimp-on elements 214. The channels can include indentations 405, for forming indents in crimp-on elements 214 during or after the bending of crimp-on elements around brake drum 208 (e.g. under pressure from a press). The indents can increase the strength of bent crimp-on elements 214.

Figure 4B:
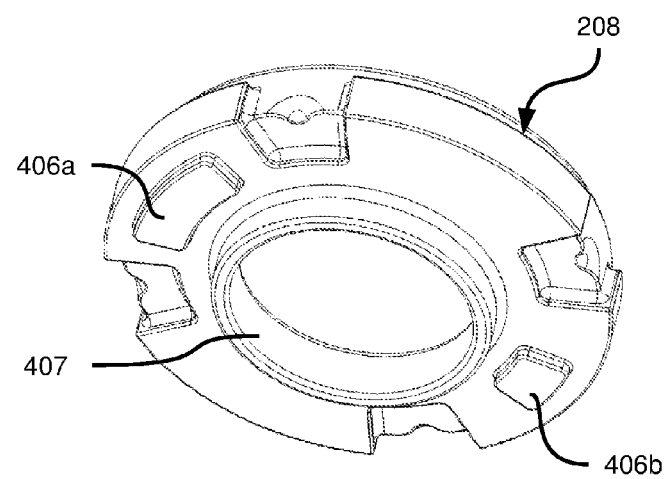

The proximal side of brake drum 208 is shown in FIG. 4B. Brake drum 208 can include at least one dimple 406 (in the present embodiment, a long dimple 406a and a short dimple 406b are shown), each configured to fit into a corresponding cutout on base plate 216 or the frame of seat 50 to correctly locate brake drum 208. In addition, brake drum 208 can include an annular central wall 407 (although in other embodiments, wall 407 need not be annular) extending proximally, for fitting into a corresponding opening in base plate 216 or seat 50. Wall 407, similarly to dimples 406, aids in correctly locating brake drum 208 during installation.

Returning to FIG. 3, actuator 100 also includes an output component 308. Output component 308 includes the above-mentioned pinion 204, integrated with a brake hub 312. In other words, pinion 204 and brake hub 312 are formed from a single piece of the same material, and together form output component 308. Pinion 204, as illustrated in FIG. 2B and FIG. 3, is configured to extend through opening 304 to engage the seat height adjustment mechanism. Brake hub 312 is rotatably receivable in outer brake race 300 (specifically, on support surface 400 of outer brake race 300), and defines an inner (i.e. closer to axis A) brake race complementary to outer brake race 300.

Figure 4C:
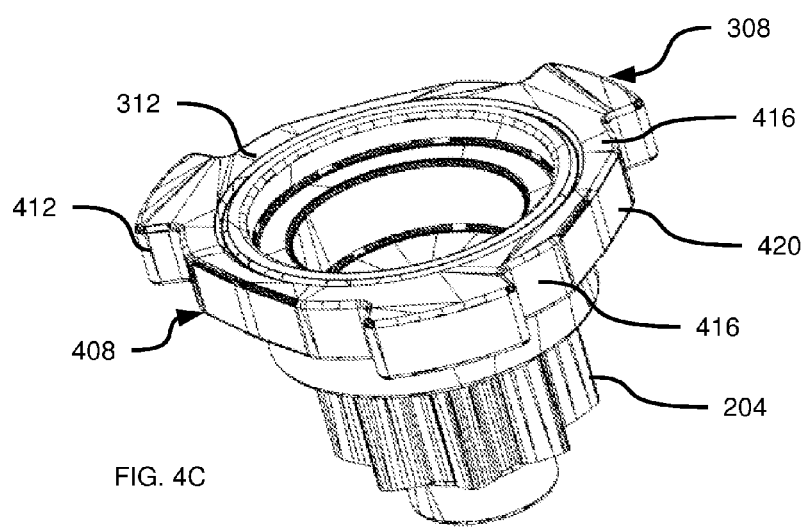
FIG. 4C depicts an output component of the actuator of FIG. 1, according to a non-limiting embodiment.

Referring to FIG. 4C, the inner brake race is provided by an outer wall of brake hub 312, and is labelled as 408. Inner brake race 408 has a variable radius, as measured from the axial center of brake hub 312 (where axis A passes through brake hub 312). Specifically, inner brake race 408 is divided into a plurality of segments—three regions, in the present embodiment—by a corresponding plurality of brake hub lobes 412. Lobes 412 also serve to guide the rotation of brake hub 312 relative to outer brake race 300. Each segment, as will be described in further detail below, includes two wedge regions 416 having a substantially constant radius and, between wedge regions 416, a travel region 420 having a smaller radius than the radius of wedge regions 416. As seen in FIG. 4C, the formation of travel region 420 of inner brake race 408 can be visualized (although travel region 420 need not be actually be manufactured in this way) as the removal of a circular segment from the outer wall of brake hub 312, effectively "flattening" inner brake race 408 between the remaining circular portions (which form wedge regions 416).

Returning to FIG. 3, actuator 100 also includes a plurality of rolling brake elements 316 that are disposed between the inner and outer brake races 408 and 300. Rolling brake elements 316 are configured to lock brake hub 312 (and, by extension, pinion 204 which is integrated with brake hub 312) relative to brake drum 208 in the absence of an actuator input to handle 200 (that is, when actuator 100 is at rest). The locking action of rolling brake elements 316 is enabled by, in combination with rolling brake elements 316 themselves, biasing brake elements 320 and the space (i.e. channel) defined between inner and outer brake races 408 and 300.

Figure 5A:
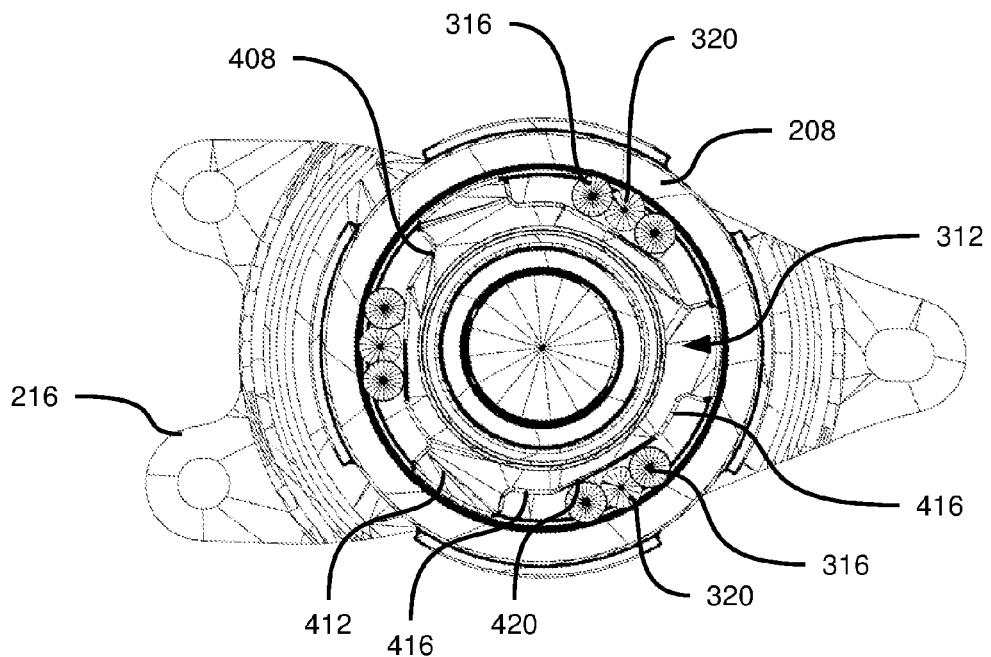
FIGS. 5A and 5B depict partially assembled views of the actuator of FIG. 1, according to a non-limiting embodiment.
Figure 5B:
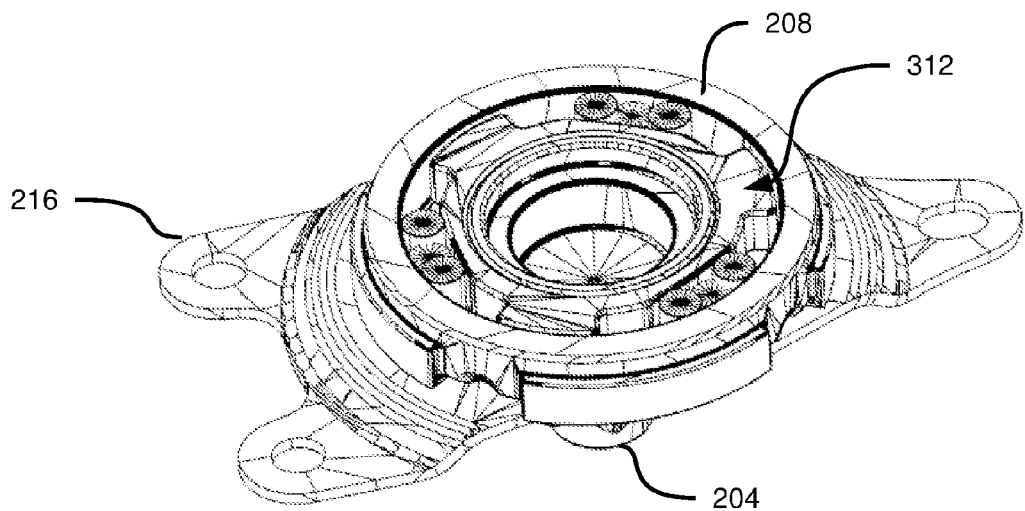

Turning to FIGS. 5A and 5B, top and perspective views of actuator 100 in a partially-assembled state are shown. Specifically, the components from FIG. 3 that are located distally from rolling brake elements 316 and biasing brake elements 320 are omitted in FIGS. 5A and 5B. As seen particularly in FIG. 5B, when installed, brake hub 312 is received within outer brake race 300 of brake drum 208, and pinion 204 extends through opening 304 in brake drum 208. Rolling brake elements 316 include a plurality of pairs—three pairs, in the present embodiment, although other suitable numbers of pairs can also be employed—of roller bearings. Each pair of roller bearings is disposed within a channel defined by inner and outer brake races 408 and 300, and between adjacent lobes 412. Each pair of roller bearings is also separated by one of the biasing brake elements 320, which in the present embodiment are bumpers (e.g. urethane bumpers). Each triplet of components (two rollers and one bumper) are disposed in the portion of the above-mentioned channel defined by a travel region 420 of inner brake race 308.

As best seen in FIG. 5A, each biasing brake element 320 biases the corresponding pair of rolling brake elements 316 towards the narrowed portions of the above-mentioned channel defined by wedge portions 416 of inner brake race 408. Rolling brake elements 316 are larger than the narrowed portions of the channel. As a result, rolling brake elements 316 engage both inner and outer brake races 408 and 300, and thus (in the absence of actuator input) prevent the movement of brake hub 312 (and therefore of output component 308 in its entirety) relative to brake drum 208. As will be discussed below, an actuator input is transmitted from handle 200 to displace rolling brake elements 316 and biasing brake elements 320 in order to permit motion of output component 308 relative to brake drum 208.

Figure 6A:
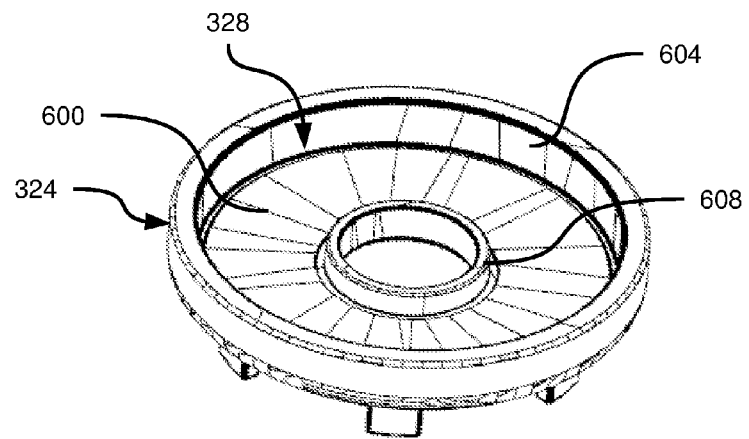
FIG. 6A depicts a clutch drum of the actuator of FIG. 1, according to a non-limiting embodiment.

Returning to FIG. 3, the transmission of actuator input mentioned above is enabled by a clutch assembly. The clutch assembly includes a clutch drum 324 configured to rotatably cover inner and outer brake races 408 and 300 when actuator 100 is assembled. Clutch drum 324 also defines an outer clutch race 328. Referring to FIG. 6A, outer clutch race 328 is defined by a support surface 600 substantially perpendicular to axis A, and an outer wall 604 substantially parallel to axis A, as seen in FIG. 3. Clutch drum 324 can also include a central ring 608, which will be discussed below.

Figure 6B:
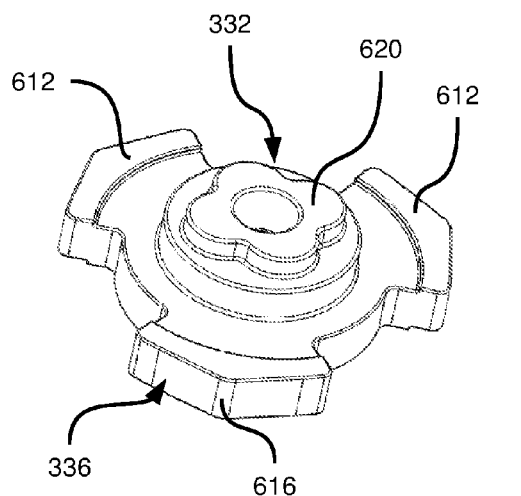
FIGS. 6B and 6C depict a driver cam of the actuator of FIG. 1, according to a non-limiting embodiment.
Figure 6C:
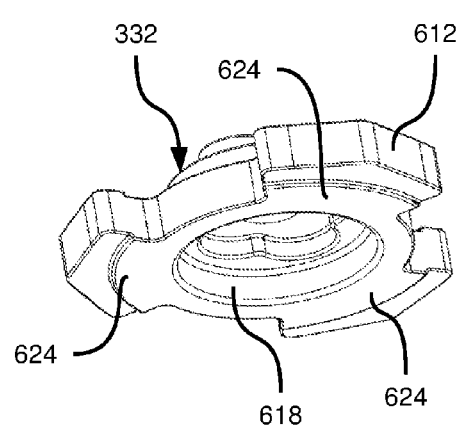

Returning briefly to FIG. 3, the clutch assembly also includes a driver cam 332 that is rotatably receivable within outer clutch race 328, and that defines an inner clutch race 336 complementary to outer clutch race 328. Turning to FIGS. 6B and 6C, inner clutch race 336 is defined by an outer wall of driver cam 332. In particular, in the present embodiment, driver cam 332 includes a central body and a plurality of lobes 612 (three lobes, in the present embodiment, although other numbers of lobes can also be provided). Each lobe 612 includes a peak 616 region or point having a greater radius (as measured from the axial center of driver cam 332) than the remainder of the lobe 616. In other words, inner clutch race 336 has a plurality of wedge regions defined by peaks 616 of lobes 612. In addition, the central body of driver cam 332 can include a central ring 618, for cooperating with central ring 608 of clutch drum 324 to substantially prevent movement (other than rotation about axis A) of driver cam 332 in a plane perpendicular to axis A. Further, driver cam 332 includes a boss 620 for coupling driver cam 332 to handle 200, as will be described below. In the present embodiment, boss 620 has a clover-like configuration, including four leaves for interlocking with a correspondingly-shaped structure on handle 200.

As shown in FIG. 6C, driver cam 332 can also include at least one (three, in the present embodiment) running pad 624 protruding from the lower surface thereof. Running pads 624 provide a reduced contact surface between driver cam 332 and clutch drum 324, and thus reduce the need to eliminate surface roughness or other imperfections on the lower surface of driver cam 332.

Returning to FIG. 3, the clutch assembly also includes a plurality of rolling clutch elements 340 for installation between the inner and outer clutch races 336 and 328. Rolling clutch elements 340, which in the present embodiment are roller bearings, are configured to transmit an actuator input to clutch drum 324, and also to permit rotation of driver cam 332 relative to clutch drum 324 in the absence of an actuator input. A plurality of biasing clutch elements, in the form of springs in the present embodiment, are also included in the clutch assembly; the rolling clutch elements 340, biasing clutch elements 344 and the channel formed by inner and outer clutch races 336 and 328 together enable the above-mentioned transmission of actuator input and independent rotation of driver cam 332 in the absence of actuator input.

Figure 7A:
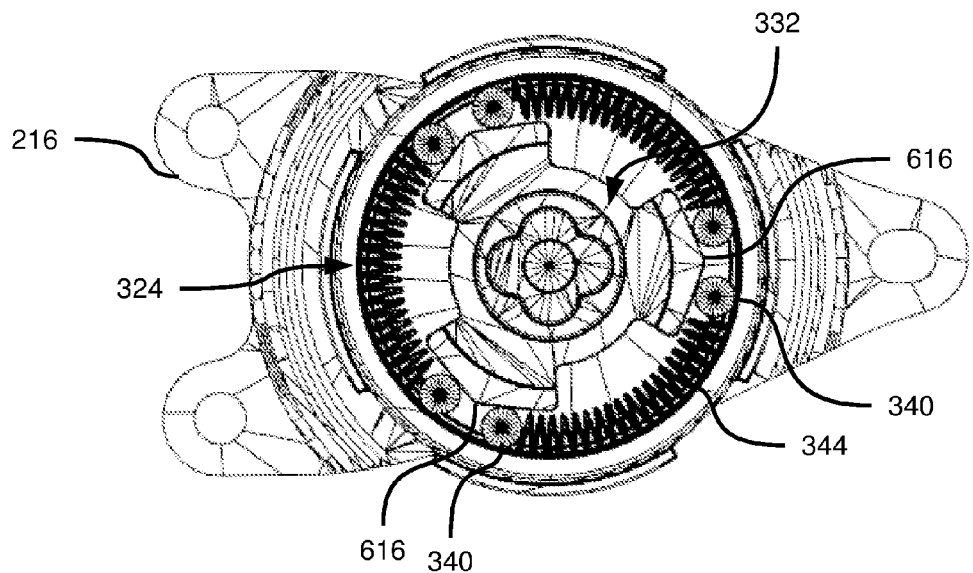
FIGS. 7A and 7B depict further partially assembled views of the actuator of FIG. 1, according to a non-limiting embodiment
Figure 7B:
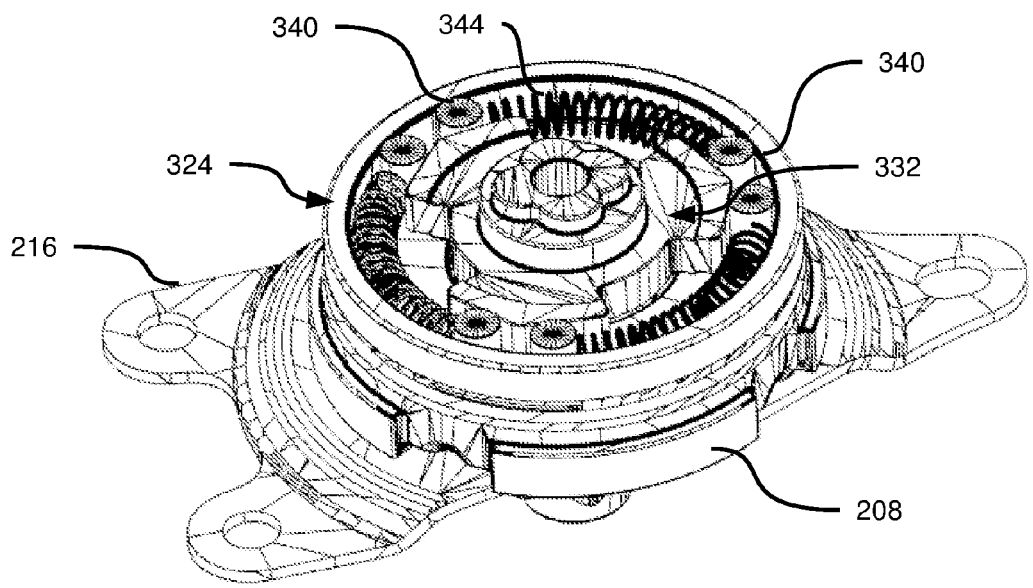

Turning now to FIGS. 7A and 7B, the assembles shown in FIGS. 5A and 5B are shown, with the addition of the above-mentioned clutch assembly. Components of actuator 100 located distally of the clutch assembly are not shown. As seen particularly in FIG. 7B, driver cam 332 is received within outer clutch race 328, and a channel is defined between outer clutch race 328 and inner clutch race 336 into which rolling clutch elements 340 and biasing clutch elements 344 are placed. In particular, as best seen in FIG. 7A, rolling clutch elements 340 include a plurality of pairs (three pairs, in the present embodiment) of roller bearings. A single pair is labelled in each of FIGS. 7A and 7B for legibility. Each pair of roller bearings is disposed between adjacent peaks 616 defined by lobes 612 of driver cam 332. One of the biasing clutch elements (springs, in the present embodiment) is disposed between the pair of rolling clutch elements 340, and is configured to be under compression so as to bias the pair of roller bearings away from each other and into respective peaks 616. The channel between inner and outer clutch races 336 and 328 is narrower at peaks 616 than rolling clutch elements 340, and thus rolling clutch elements 340 are contained within a portion of the above-mentioned channel between two adjacent lobes 612.

Figure 8A:
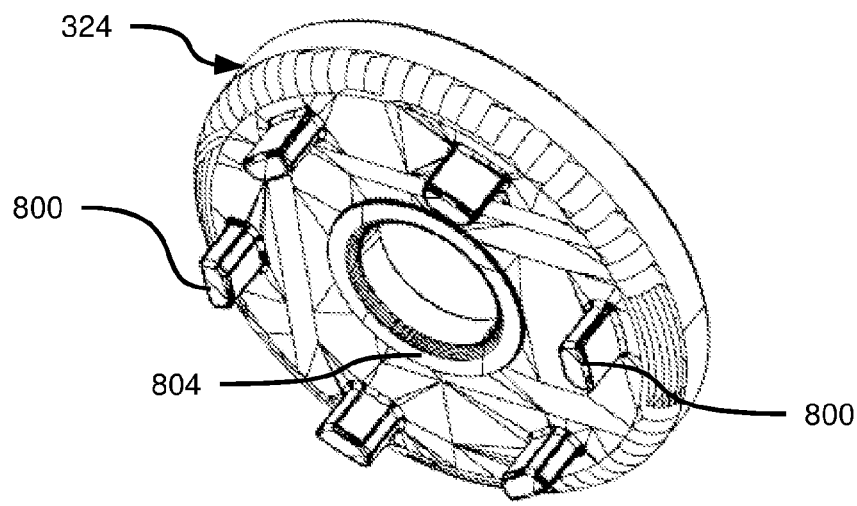
FIG. 8A depicts the clutch drum of FIG. 6A, according to a non-limiting embodiment
Figure 8B:
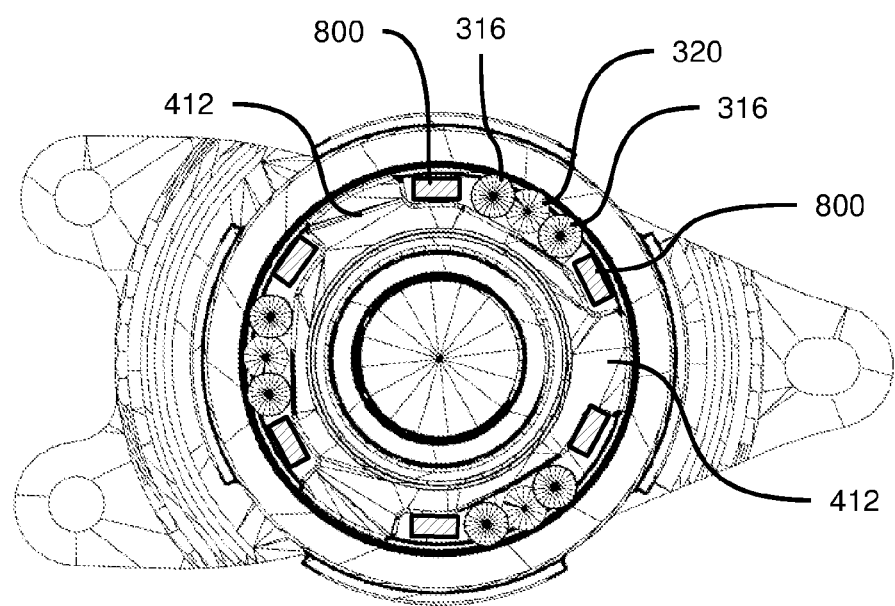
FIG. 8B depicts a cross-sectional view of the partially assembled actuator of FIG. 7A, according to a non-limiting embodiment.

Turning now to FIG. 8A, clutch drum 324 also includes a plurality of clutch tabs 800 (six clutch tabs are shown in the present embodiment) configured to extend between inner and outer brake races 408 and 300 when clutch drum 324 is installed as shown in FIGS. 7A and 7B. In the present embodiment, a pair of clutch tabs 800 is provided on clutch drum 324 for each pair of rolling brake elements 316. As seen in FIG. 8B, which illustrates a cross-sectional view of the partially-assembled actuator 100 shown in FIG. 7A, clutch tabs 800 are shown extending into the channel between inner and outer brake races 408 and 300. In particular, each pair of rolling brake elements (and the corresponding one of biasing brake elements 320) is bracketed by a pair of clutch tabs 800, which in turn are bracketed by a pair of lobes 412. Clutch drum 324 can also include, as seen in FIG. 8A, a running pad 804 protruding from the lower surface thereof. Running pad 804 provides a reduced contact surface between clutch drum 324 and brake hub 312, and thus reduces the need to eliminate surface roughness or other imperfections on the lower surface of clutch drum 324.

Returning again to FIG. 3, actuator 100 also includes exterior cup 212 as described above, configured to be fixed to brake drum 208 (e.g. by crimp-on elements 214 that can be bent around a proximal edge of brake drum 208 after installation of exterior cup 212). Exterior cup 212 and brake drum 208 together define a housing substantially enclosing output component 308 (with the exception of pinion 204) and the above-mentioned clutch assembly. Exterior cup 212 also includes an opening 348 therethrough. Actuator 100 can also include a spacer 352 for disposition between driver cam 332 and exterior cup 212.

Figure 9A:
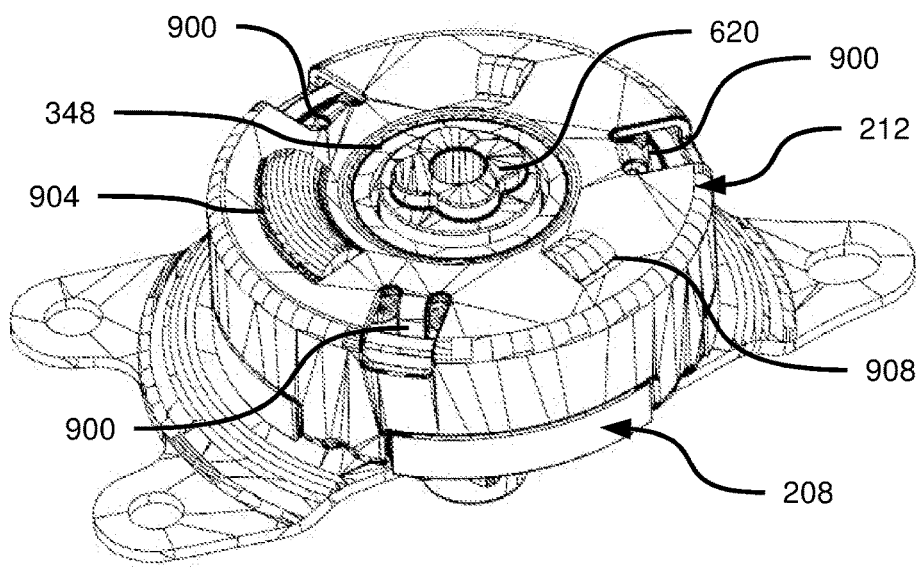
FIG. 9A depicts another partially assembled view of the actuator of FIG. 1, according to a non-limiting embodiment.

As seen in FIG. 9A, exterior cup 212 also includes a plurality of cup tabs 900 extending in between the inner and outer clutch races 336 and 328. The partially assembled view of FIG. 9A also illustrates that boss 620 protrudes through opening 348 in exterior cup 212 when exterior cup 212 in fixed onto brake drum 208. Handle 200 (shown in FIG. 3) includes an opening configured to mate with boss 620, and thus when handle 200 receives an actuator input, the actuator input is transmitted to driver cam 332 via boss 620. Exterior cup 212 can also include at least one handle stop; in the present embodiment, a long handle stop 904 and two short handle stops 908 are shown. Together, handle stops 904 and 908 mate with corresponding structures on handle 200, and act to both movably secure handle 200 to exterior cup 212 and restrict the range of motion of handle 200 relative to exterior cup 212 (e.g. to approximately 25 degrees).

Figure 9B:
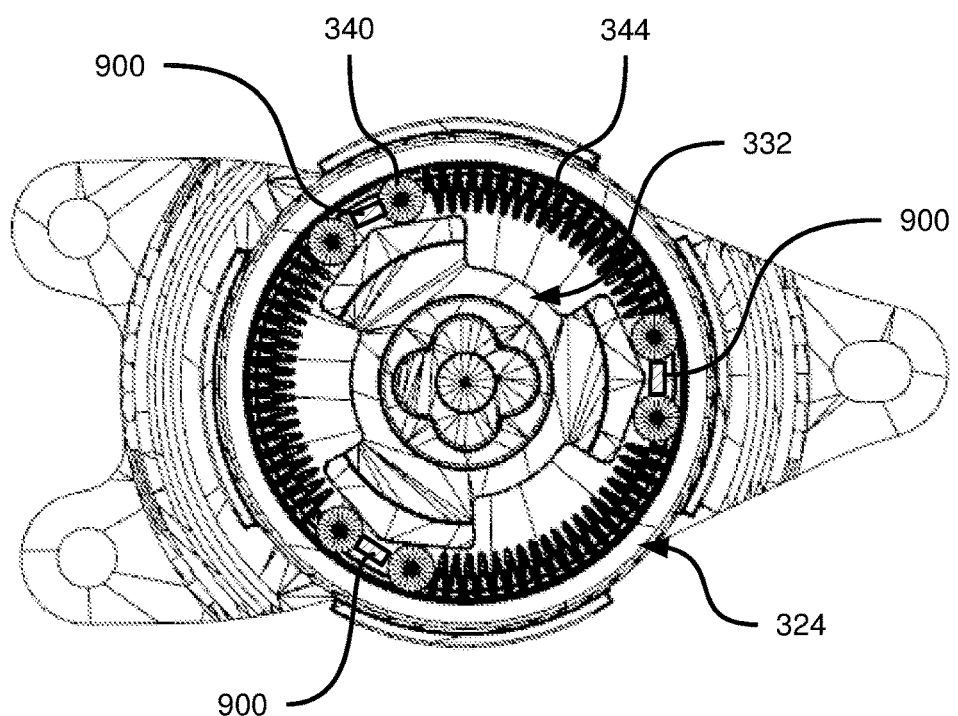
FIG. 9B depicts a partial cross-sectional view of the partially assembled actuator of FIG. 9A, according to a non-limiting embodiment.

FIG. 9B illustrates the partially-assembled actuator 100 of FIG. 7A, with the addition of a partial sectional view of exterior cup 212. Thus, cup tabs 900 are visible in the view of FIG. 9B. As noted above, exterior cup 212 is fixed to brake drum 208, and thus cup tabs 900 present immovable barriers to the movement of rolling clutch elements 340 within the channel defined by inner and outer clutch races 336 and 328.

The mechanism of operation of actuator 100 will now be apparent to those skilled in the art. A brief summary of the operation of actuator 100 will be provided below.

Actuator 100 is operated via the receipt of an actuator input at handle 200—for example, the user of seat 50 may apply a force to handle 200, causing handle 200 to rotate in one of the directions indicated by arrows 104. The actuator input (e.g. the rotation of handle 200) is transmitted to driver cam 332 via boss 620. The resulting rotation of driver cam 332 causes, as seen from FIG. 9B, peaks 616 to rotate and thus force one of each pair of rolling clutch elements 340 towards the other of each pair of rolling clutch elements 340 (recall that movement of the other of the pair is prevented by a cup tab 900). The biasing clutch elements 344 are therefore further compressed.

During the rotation of driver cam 332 and associated movement of one of each pair of rolling clutch elements 340, clutch drum rotates in the same direction as driver cam 332 due to engagement of the moving rolling clutch elements 340 with outer clutch race 328 (the moving rolling clutch elements 340 are driven into engagement with outer clutch race 328 by peaks 316).

As best seen in FIG. 8B, rotation of clutch drum 324 also rotates clutch tabs 800. In the absence of rotation of clutch drum 324, each pair of rolling brake elements 316 are biased into wedge regions 416 by one of biasing brake elements 320. Clutch tabs 800 displace one of each pair of rolling brake elements 316 out of the corresponding wedge region 416 and into travel region 420, thus unlocking brake hub 312 and permitting movement of brake hub 312 relative to brake drum 208. Movement of brake hub 312 is equivalent to movement of pinion 204, due to the integration of brake hub 312 and pinion 204 in a single part (output component 308). Thus, the actuator input at handle 200 is transmitted via the clutch assembly to output component 308.

When the actuator input ceases (i.e. the user of seat 50 releases handle 200), clutch tabs 800 no longer serve to drive rolling brake elements 316 from wedge regions 416. Rolling brake elements 316 are therefore once again biased into wedge regions 416, and movement of brake hub 312 relative to brake drum 208 is prevented. Further rotation of clutch drum 324 is also prevented. Referring again to FIG. 9B, however, movement of driver cam 332 relative to clutch drum 324 is still permitted. Specifically, the ones of rolling clutch elements 340 that moved towards their partners as described above are biased back towards their resting positions (shown in FIG. 9B) by biasing clutch elements 344. In the presence of braking force (applied by biasing brake elements 320), and the absence of force applied to handle 200, biasing clutch elements 344 drive not only rolling clutch elements 340 back towards a resting position, but also driver cam 332, by virtue of the returning rolling clutch elements 340 being driven into engagement with peaks 316 of driver cam 332.

Figure 10:
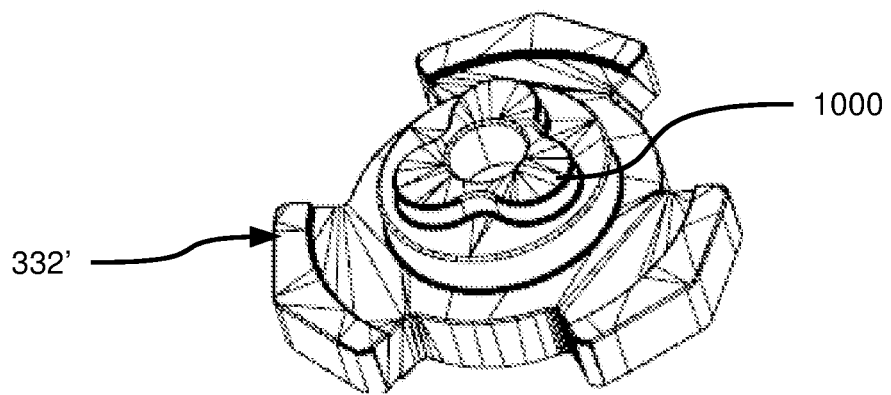
FIG. 10 depicts a driver cam of the actuator of FIG. 1, according to another non-limiting embodiment.

Variants to the above are contemplated. For example, referring to FIG. 10, a driver cam 332' is illustrated according to another embodiment, in which boss 620 is replaced with a boss 1000 having a different number of leaves (three, in the example of FIG. 10).

Figure 11A:
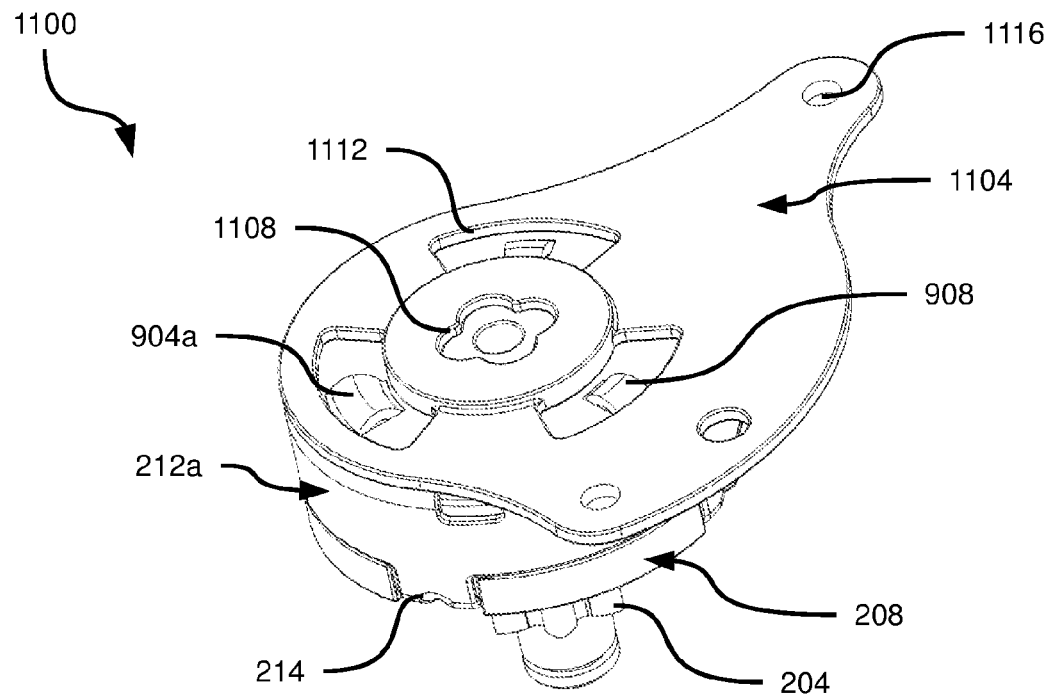
FIG. 11A depicts an actuator for a height adjustment mechanism, according to another non-limiting embodiment.

Referring now to FIG. 11A, a seat height adjustment actuator 1100 is depicted, according to another embodiment. Various components of actuator 1100 are as described above in connection with actuator 100, and have therefore been assigned the same reference numerals as set out above. Other components of actuator 1100 are modified versions of those discussed above. Those modified components bear the reference numerals of their counterparts from actuator 100, with the suffix "a". Additionally, components of actuator 1100 with no counterpart in actuator 100 bear four-digit reference numerals beginning with "11", "12" or "13".

Actuator 1100 includes an exterior cup 212a fixed to brake drum 208, for example by way of a plurality of crimp-on elements 214 that can be press-fitted around an outer wall of brake hub 208. Exterior cup 212a is as described above in connection with exterior cup 212, with the exception that long handle stop 904 is substituted with a long handle stop 904a. In particular, long handle stop 904a has a reduced length relative to long handle stop 904.

Actuator 1100 also includes a handle support plate 1104, for supporting a handle (not shown). Support plate 1104 includes a recess 1108 having a shape corresponding to that of boss 620. In the present embodiment, recess 1108 is an aperture extending through support plate 1104; in other embodiments however, recess 1108 can be a recess in the underside of plate 1104, without extending through plate 1104. As seen in FIG. 11A, boss 620 is received within recess 1108 to fix support plate 1104 to boss 620 (and therefore to driver cam 332).

Support plate 1104 also includes handle stop recesses 1112 (three recesses are shown, corresponding to long handle stop 904a and short handle stops 908). As will now be apparent, support plate 1104, when coupled to boss 620, is enabled to rotate relative to exterior cup 212a about an axis of rotation of the movable components of actuator 1100 (see FIG. 3, axis A). Recesses 1112 act to limit the range of motion of support plate 1104.

Support plate 1104 also includes at least one aperture 1116 (three are illustrated in FIG. 11A) for coupling support plate 1104 to any of a variety of handles (not shown).

Figure 11B:
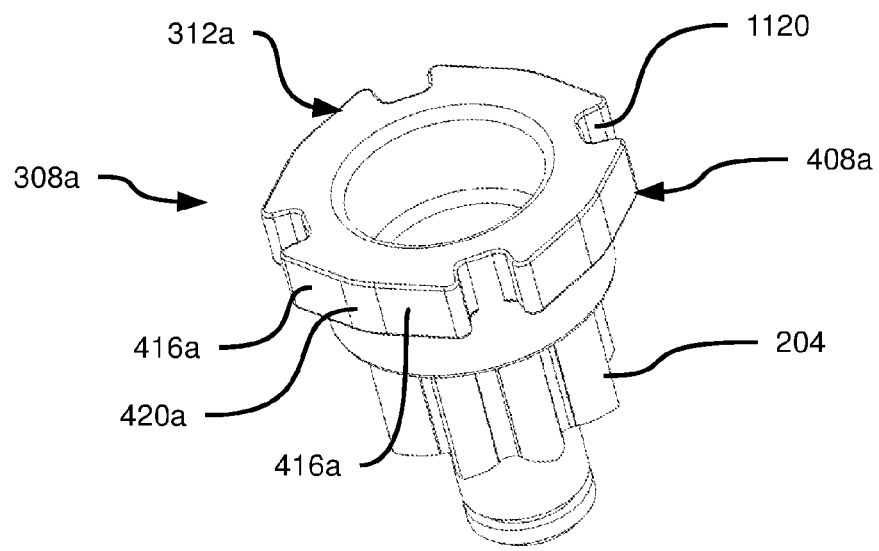
FIG. 11B depicts an output component of the actuator of FIG. 11A, according to another non-limiting embodiment.

Referring to FIG. 11B, actuator 1100 includes an output component 308a that includes pinion 204 (also visible in FIG. 11A) integrated with a brake hub 312a. Brake hub 312a defines an inner brake race 408a including a plurality of segments (four, in the illustrated embodiment), each including a pair of wedge regions 416a separated by a travel region 420a. As discussed earlier in connection with actuator 100, wedge regions 416a have greater radii relative to axis A, while travel regions 420a have smaller radii relative to axis A than wedge regions 416a. Brake hub 312a includes, rather than lobes 412, notches 1120 separating each segment (that is, each set of two wedge regions 416a and a travel region 420a). The function of notches 1120 will be described below.

Figure 12A:
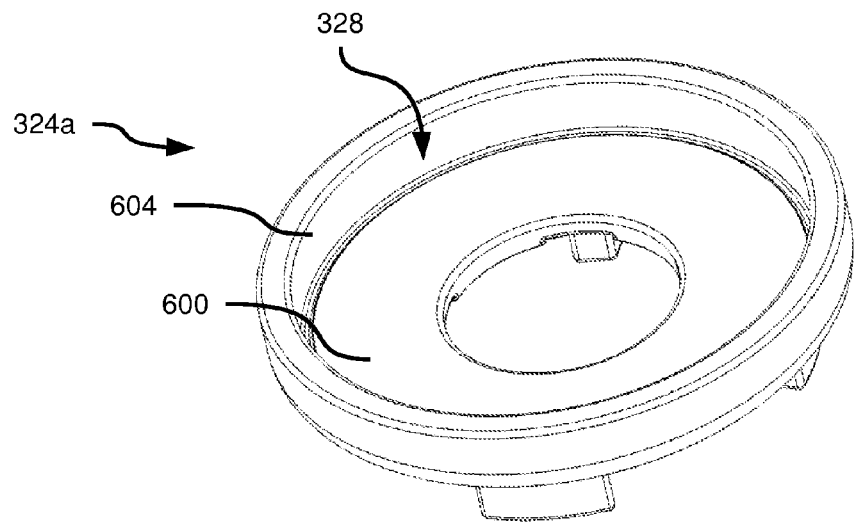
FIGS. 12A and 12B depict top isometric and bottom isometric views of a clutch drum of the actuator of FIG. 11A, according to another non-limiting embodiment.
Figure 12B:
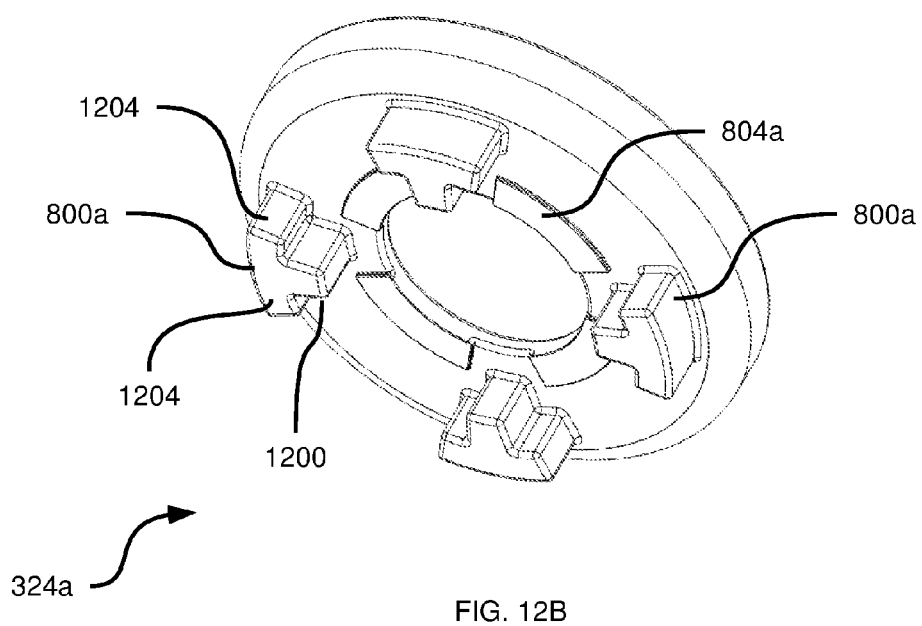

Turning to FIG. 12A, a clutch drum 324a of actuator 1100 is illustrated. Clutch drum 324a defines outer clutch race 328 by way of support surface 600 and outer wall 604. It will be apparent from FIG. 12A that central ring 608 is omitted from clutch drum 324a. As shown in FIG. 12B, clutch drum 324a also includes a plurality of clutch tabs 800a (four, in the illustrated embodiment). In contrast to clutch tabs 800 of actuator 100, clutch tabs 800a are provided in a one-to-one relationship with the segments of inner brake race 408a. That is, there are equal numbers of segments on inner brake race 408a and of clutch tabs 800a, whereas in actuator 100 there are two clutch tabs 800 for each segment of inner brake race 408.

In addition, each clutch tab 800a includes a driving spine 1200 and a pair of opposing unlocking ribs 1204 extending from either side of the distal end (that is, the end furthest from axis A) of spine 1200. Thus, each clutch tab 800a is generally T-shaped. As also seen in FIG. 12B, clutch drum 324a also includes a running pad 804a comprising a plurality of a discrete segments, rather than a single annular running pad 804 as in actuator 100.

Figure 13A:
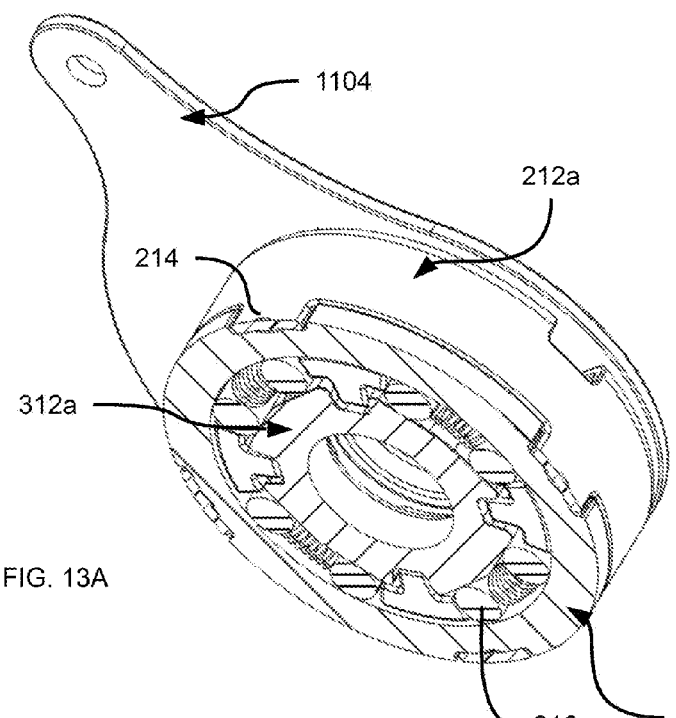
FIGS. 13A and 13B depict isometric cross and bottom plan view cross sections of the actuator of FIG. 11A, according to another non-limiting embodiment.
Figure 13B:
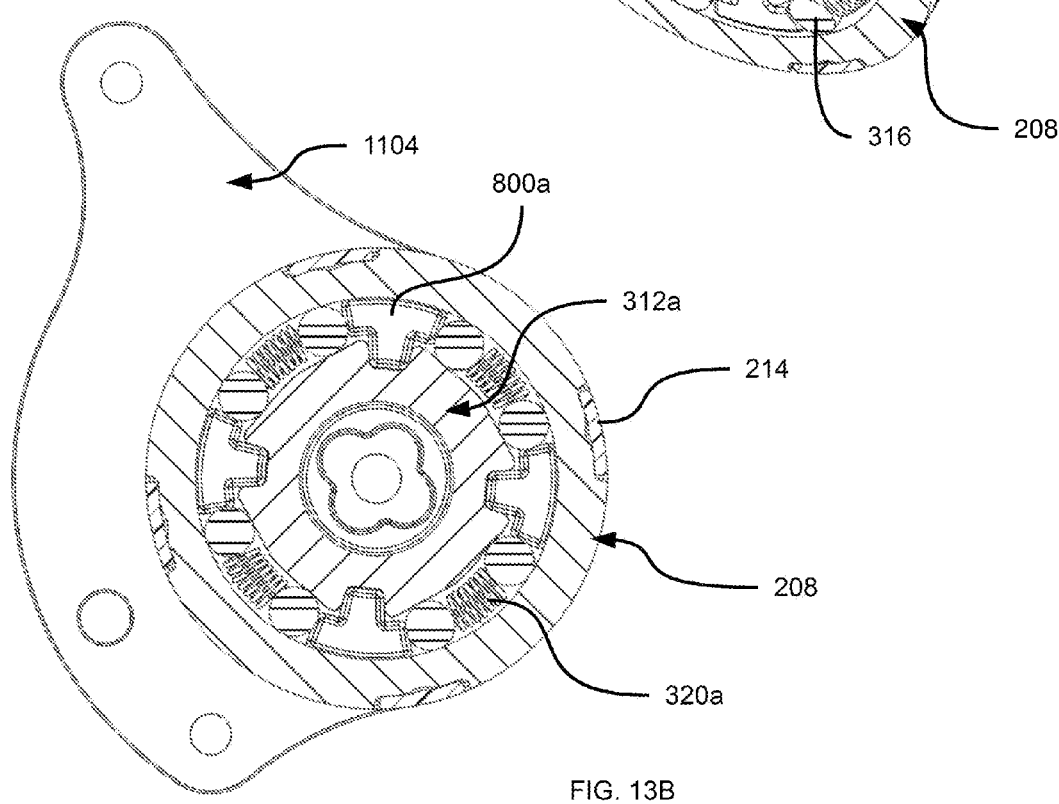

Referring now to FIGS. 13A and 13B, a cross-section of actuator 100 is illustrated, depicting the arrangement of brake drum 208, brake hub 312a and clutch tabs 800a when actuator 1100 is assembled. In addition to the components introduced above, rolling brake elements 316 are also illustrated, as are biasing brake elements 320a, which in the present embodiment are coiled springs rather than the bumpers illustrated in connection with actuator 100.

As seen in FIGS. 13A and 13B, spines 1200 of clutch tabs 800a engage with corresponding notches 1120, while ribs 1204 extend between the inner and outer brake races, towards respective rolling brake elements 316. As will now be apparent, application of a force to support plate 1104 (e.g. via a handle) causes rotation of driver cam 332, which in turn causes rotation of clutch drum 324a as discussed in connection with actuator 100. The resulting rotation of clutch tabs 800a about axis A drives rotation of brake hub 312a (and therefore also pinion 204). More specifically, spines 1200 drive rotation of brake hub 312a, while ribs 1204 unlock rolling brake elements 316 by preventing one of each pair of rolling brake elements 316 from becoming further wedged in response to the rotation of brake hub 312a.

Figure 14:
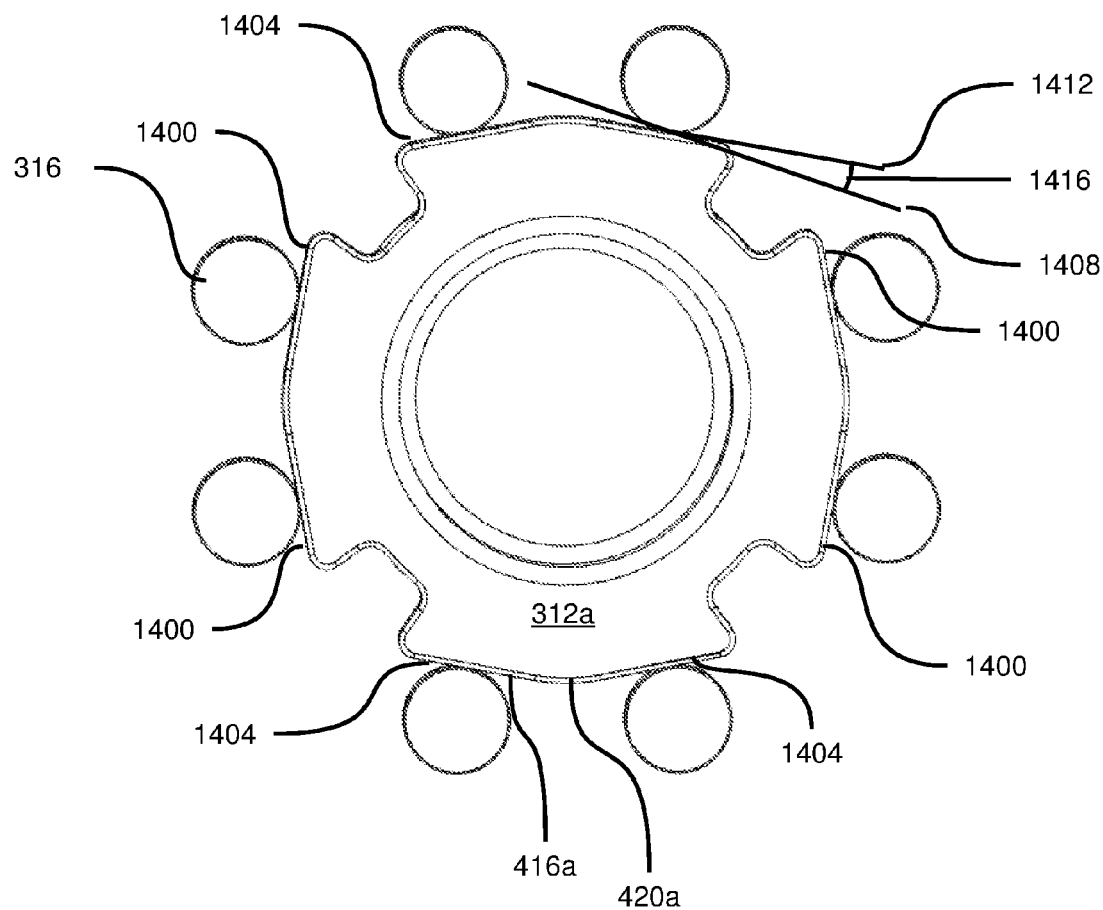
FIG. 14 depicts pressure angles of the brake hub of the actuator of FIG. 11A, according to a further non-limiting embodiment.

Referring now to FIG. 14, brake hub 312a and rolling brake elements 316 are depicted in isolation. The engagement between wedge regions 416a and rolling brake elements is characterized at least in part by a pressure angle. As will be apparent to those skilled in the art, the pressure angle is the angle between a tangent of the body of brake hub 312a at the point of contact with a rolling brake element 316 and the actual surface of brake hub 312a at that point.

Brake hub 312a includes a plurality of cam surfaces. In particular, a first plurality of cam surfaces 1400 and a second plurality of cam surfaces 1404 are illustrated. The cam surfaces are the surfaces of wedge regions 416a. The pressure angle of a cam surface 1404 is illustrated in FIG. 14 with a tangent 1408 and an extension 1412 of the cam surface 1404. The angle 1416 is the pressure angle. In the present embodiment, brake hub 312a employs distinct pressure angles for first and second pluralities of cam surfaces 1400 and 1404. For example, first cam surfaces 1400 can have pressure first angles that are larger than second pressure angles of second cam surfaces 1404. More specifically, in an example embodiment the first pressure angle is between eight and ten degrees (e.g. 8.5 degrees), while the second pressure angle is between As will be apparent, smaller pressure angles result in greater locking force applied by the brake assembly, as the corresponding rolling brake element 316 is permitted to wedge to a greater degree between brake hub 312a and brake drum 208. Larger pressure angles, on the other hand, result in smaller locking forces, as the steeper angle with which outer brake race 300 and inner brake race 408a approach each other reduce the extent to which rolling brake element 316 can wedge between the brake races. It will also be apparent that greater locking forces require greater actuator input to dislodge and unlock. Therefore, by employing a combination of different pressure angles, brake hub 312a may reduce the incidence of creeping motion (e.g. brought on by vehicle vibration) without increasing the required unlocking force unduly (though the required unlocking force is increased to a degree). A variety of combinations of different pressure angles may be implemented to tune the performance of actuator 100 (i.e. balancing resistance to creeping with ease of unlocking by an operator).

Additional variations to the embodiments described herein will occur to those skilled in the art. The scope of the claims should not be limited by the embodiments set forth in the above examples, but should be given the broadest interpretation consistent with the description as a whole.

We claim:

1. A seat height adjustment actuator, comprising:
 (a) a brake drum for fixing to a seat, and defining an outer brake race around an opening through the brake drum; an output component including:
   (i) a brake hub rotatably receivable in the outer brake race, and defining an inner brake race complementary to the outer brake race; the inner brake race defining a plurality of brake cam surfaces, a first subset of the brake cam surfaces having a first pressure angle, and a second subset of the brake cam surfaces having a second pressure angle greater than the first pressure angle; and
   (ii) a pinion integrated with the brake hub, and configured to extend through the brake drum opening to engage a seat adjustment mechanism;
 (b) a plurality of rolling brake elements between the inner and outer brake races, wherein in the absence of an actuator input, (i) a first subset of the rolling brake elements wedges between the outer brake race and respective ones of the first subset of brake cam surfaces, and (ii) a second subset of the rolling brake elements wedges between the outer brake race and respective ones of the second subset of brake cam surfaces, for locking the brake hub relative to the brake drum in the absence of the actuator input;
 (c) a clutch assembly including:
   (i) a clutch drum rotatably supported adjacent to the inner and outer brake races, the clutch drum defining an outer clutch race and having a plurality of clutch tabs configured to extend between the inner and outer brake races for displacing the rolling brake elements to unlock the brake hub in response to the actuator input;
   (ii) a driver cam rotatably receivable within the outer clutch race; the driver cam defining an inner clutch race complementary to the outer clutch race; the driver cam configured for coupling to a handle for receiving the actuator input; and
   (iii) a plurality of rolling clutch elements between the inner and outer clutch races, for transmitting an actuator input to the clutch drum and permitting rotation of the driver cam relative to the clutch drum in the absence of the actuator input; and
 (d) an exterior cup fixed to the brake drum to define a housing enclosing the output component and the clutch assembly; the exterior cup having an opening therethrough.

2. The seat height adjustment actuator of claim 1, further comprising:
 a handle support plate, connected to the driver cam through the opening in the exterior cup, for receiving the actuator input.

3. The seat height adjustment actuator of claim 2, further comprising:
 a handle connected to the handle support plate, for receiving the actuator input and transferring the actuator input to the handle support plate.

4. The seat height adjustment actuator of claim 1, further comprising:
   a handle connected directly to the driver cam, for receiving the actuator input and transferring the actuator input to the driver cam.

5. The seat height adjustment actuator of claim 1, the driver cam comprising a multi-lobed boss for coupling to the handle.

6. The seat height adjustment actuator of claim 1, the rolling brake elements arranged in pairs; the actuator further comprising a biasing brake element between each pair of rolling brake elements, for biasing the pair of rolling brake elements into engagement with respective brake cam surfaces and the outer brake race, to lock the brake hub.

7. The seat height adjustment actuator of claim 6, wherein each biasing brake element comprises one of a bumper and a spring.

8. The seat height adjustment actuator of claim 1, the driver cam including a central body and a plurality of lobes extending radially from the central body, each lobe defining a portion of the inner clutch race.

9. The seat height adjustment actuator of claim 8, each of the plurality of lobes defining a pair of wedge regions for the rolling clutch elements.

10. The seat height adjustment actuator of claim 1, comprising two clutch tabs for each pair of the rolling brake elements.

11. The seat height adjustment actuator of claim 1, comprising one clutch tab for each pair of rolling brake elements.

12. The seat height adjustment actuator of claim 11, the brake hub including a plurality of notches in the inner brake race.

13. The seat height adjustment actuator of claim 12, the clutch tabs each including a spine for engaging with a corresponding one of the notches, to drive rotation of the brake hub responsive to the actuator input.

14. The seat height adjustment actuator of claim 13, the clutch tabs each including ribs extending between the inner and outer brake races, to unlock the rolling brake elements responsive to the actuator input.

15. The seat height adjustment actuator of claim 1, further comprising a base plate for fixing the brake drum to the seat.

16. The seat height adjustment actuator of claim 1, wherein the exterior cup comprises a plurality of crimp-on elements configured to engage the brake drum to define the housing.

* * * * *